United States Patent [19]

Suzuki et al.

[11] Patent Number: 5,093,174
[45] Date of Patent: Mar. 3, 1992

[54] OPTICAL RECORDING MEDIUM

[75] Inventors: Kazutomi Suzuki; Takashi Tomie, both of Hino; Kiyoshi Chiba, Chofu; Tadanori Nakatani; Kimio Kinoshita, both of Hino, all of Japan

[73] Assignee: Teijin Limited, Osaka, Japan

[21] Appl. No.: 528,981

[22] Filed: May 25, 1990

[30] Foreign Application Priority Data

| Jul. 4, 1989 | [JP] | Japan | 1-171191 |
| Aug. 9, 1989 | [JP] | Japan | 1-204891 |
| Oct. 30, 1989 | [JP] | Japan | 1-279893 |
| Feb. 13, 1990 | [JP] | Japan | 2-29431 |
| Feb. 13, 1990 | [JP] | Japan | 2-29432 |

[51] Int. Cl.$^5$ ............................................. B32B 3/02
[52] U.S. Cl. ............................... 428/64; 428/65; 428/457; 428/913; 430/945; 346/76 L; 346/135.1; 369/275.1; 369/284; 369/286; 369/288
[58] Field of Search .............. 369/284, 286, 288, 275.1; 346/76 L, 135.1; 430/945; 428/64, 65, 457, 913

[56] References Cited

U.S. PATENT DOCUMENTS

| 4,430,659 | 2/1984 | Maffitt et al. | 365/113 |
| 4,547,876 | 10/1985 | Ettenberg | 365/275.1 |
| 4,556,893 | 12/1985 | Rinehart et al. | 430/945 |
| 4,638,335 | 1/1987 | Smith et al. | 430/945 |
| 4,754,128 | 6/1988 | Takeda et al. | 235/488 |
| 4,820,778 | 4/1989 | Ohtani et al. | 525/380 |
| 4,839,883 | 6/1989 | Nagata et al. | 430/945 |

FOREIGN PATENT DOCUMENTS

| 52-31703 | 10/1977 | Japan . |
| 56-126907 | 10/1981 | Japan . |
| 58-73746 | 5/1983 | Japan . |
| 58-83346 | 5/1983 | Japan . |
| 59-8150 | 1/1984 | Japan . |
| 59-38781 | 3/1984 | Japan . |
| 59-132434 | 7/1984 | Japan . |
| 59-171054 | 9/1984 | Japan . |
| 61-57053 | 3/1986 | Japan . |
| 61-165846 | 7/1986 | Japan . |
| 61-194664 | 8/1986 | Japan . |
| 62-52744 | 3/1987 | Japan . |
| 62-137743 | 6/1987 | Japan . |
| 62-239349 | 10/1987 | Japan . |
| 1-4938 | 1/1989 | Japan . |
| 1-66847 | 3/1989 | Japan . |
| 1-86348 | 3/1989 | Japan . |
| 1-86349 | 3/1989 | Japan . |

*Primary Examiner*—Patrick J. Ryan
*Attorney, Agent, or Firm*—Sughrue, Mion, Zinn Macpeak & Seas

[57] ABSTRACT

A metal reflecting layer of an aluminum or silver alloy containing gold has a lower thermal conductivity than aluminum or silver and gold while maintaining a high reflectivity, and thus an optical recording medium, particularly a magneto-optical recording medium, having a high recording sensitivity and a C/N ratio, as well as an improved durability, can be provided. The content of Au in the Al alloy is 0.5–20 at % and that in the silver alloy is 0.5–30 at %. Preferably, at least one of the group consisting of titanium, tantalum, zirconium and yittrium is added to an alloy of Al or Ag with Au, and the content of at least one of the group consisting of titanium, tantalum, zirconium and yittrium is preferably 0.3–5.0 at % in an Al-Au alloy and 0.3–12.0 at % in an Ag-Au alloy. More preferably, the total content of Au and at least one of the group consisting of titanium, tantalum, zirconium and yittrium is 1.0–15 at %.

22 Claims, 4 Drawing Sheets

OPTICAL RECORDING MEDIUM

BACKGROUND OF THE INVENTION

1. Field of the Invention

The present invention relates to an optical recording medium in which information is recorded, reproduced and erased by a light such as a laser beam. More specifically, the present invention relates to an optical recording medium having a metal reflecting layer, and is particularly preferably applicable to a magneto-optical recording type optical recording medium.

2. Description of the Related Art

Optical recording media are now being investigated and developed because of their ability to provide a high density recording and their large capacity for storing information. Particularly, a magneto-optical recording medium is required, and various materials and systems have been proposed because of the wide applicability of these media to various fields.

Many magneto-optical recording materials including, for example, TbFe disclosed in Japanese unexamined Patent Publication (Kokai) No. 52-31703, TbFeGd disclosed in Japanese Unexamined Patent Publication (Kokai) No. 56-126907, TbFeCo and DyFeCo disclosed in Japanese Unexamined Patent Publication (Kokai) No. 58-73746, and NdFe disclosed in Japanese Unexamined Patent Publication (Kokai) No. 61-165846, have been proposed. Nevertheless, a further improvement of the recording and reproducing characteristics of the media using these materials must be made before these media can be practically used.

Accordingly, a metal reflecting layer formed on a magneto-optical recording layer or that formed on a dielectric layer present on a magneto-optical recording layer has been proposed, and this is advantageous because a high carrier to noise ratio (C/N ratio) is obtained by utilizing the Faraday effect as well as the Kerr effect. As such a metal reflecting layer, proposals including, for example, a layer of Al disclosed in Japanese Unexamined Patent Publication (Kokai) Nos. 58-83346 and 59-132434, a layer of Cu disclosed in Japanese Unexamined Patent Publication (Kokai) No. 59-8150, a layer of an Al-based alloy disclosed in Japanese Unexamined Patent Publication (Kokai) No. 62-137743, a layer of stainless steel disclosed in Japanese Unexamined Patent Publication (Kokai) No. 59-171054, a layer of Te disclosed in Japanese Unexamined Patent Publication (Kokai) No. 62-52744, and a layer of an amorphous metal disclosed in Japanese Unexamined Patent Publication (Kokai) No. 59-171054, have been made. Nevertheless, when a layer of a metal having a high reflectivity such as Ag, Al, Cu or the like is used, the recording sensitivity is remarkably lowered because of a high thermal conductivity thereof, and when a layer of a metal having a relatively low thermal conductivity such as Te, stainless steel or the like is used, the recording sensitivity is increased but a sufficiently high C/N ratio is not obtained because of a low reflectivity thereof.

Moreover, a recording layer tends to deteriorate under high temperature and high humidity atmospheric conditions, and therefore, the recording layer must be protected by the metal layer.

To solve the above problems, an addition of Ta to Al is proposed in Japanese Unexamined Patent Publication (Kokai) No. 64-4938, an addition of Ti, Mg or a transition metal to Au, Ag, Al or Cu is proposed in Japanese Unexamined Patent Publication (Kokai) No. 59-38781, an addition of Cu-Mg, Mg-Si, Cr, Sn, or Mg to Al is proposed in Japanese Unexamined Patent Publication (Kokai) No. 62-239349, and an addition of Ti to Al is proposed in Japanese Unexamined Patent Publication (Kokai) Nos. 62-137743 and 64-66847. These alloy layers bring an improvement of the thermal conductivity to some extent, while maintaining a high reflectivity thereof. Nevertheless, a considerable amount of the additive metal(s) is needed in the above alloys, to improve the durability of the medium under high temperature and high humidity conditions, and thus lowers the reflectivity below the level necessary for a reflecting layer. Accordingly, the above alloy reflecting layers cannot satisfy the requirements for both the reflecting layer and the protecting layer.

Furthermore, in the case of an Al alloy, a problem arises in that a uniform target of the alloy for sputtering is difficult to obtain, but such a uniform target is essential for commercially producing media using the Al alloy reflecting layer. Namely, a large difference of the melting points between Al and the additive metal prevents the production of a uniform Al alloy by a melting process. Namely, the melting point of Al is 660° C. and those of the above additives are from 1453° C. of Ni to 2977° C. of Ta. Therefore, only a small amount of the additive metal can be uniformly mixed in the Al alloy, or if a larger amount of the additive metal is mixed for an effective lowering of the thermal conductivity of the alloy, only a non-uniform can be obtained.

SUMMARY OF THE INVENTION

The object of the present invention is to provide an optical recording medium having a high sensitivity, a high C/N ratio, and a high durability, by improving the metal reflecting layer.

The above and other objects and features of the present invention can be attained by an optical recording medium comprising: a transparent substrate; an optical recording layer deposited over the substrate; and a metal reflecting layer deposited over the recording layer; wherein the metal reflecting layer consists essentially of an alloy of aluminum with 0.5 to 20 at %, preferably 2.0 to 15 at %, gold or an alloy of silver with 0.5 to 30 at %, preferably 2.0 to 15 at %, gold.

DESCRIPTION OF THE PREFERRED EMBODIMENTS

The present inventors investigated ways in which to overcome the above-mentioned problems, and found that a metal reflecting layer of an alloy of Al or Ag with Au provides an optical recording medium having a high recording sensitivity, a high C/N ratio, and a high durability, and an alloy of Al with Au is easily produced in a uniform sputtering target.

Figure 1:
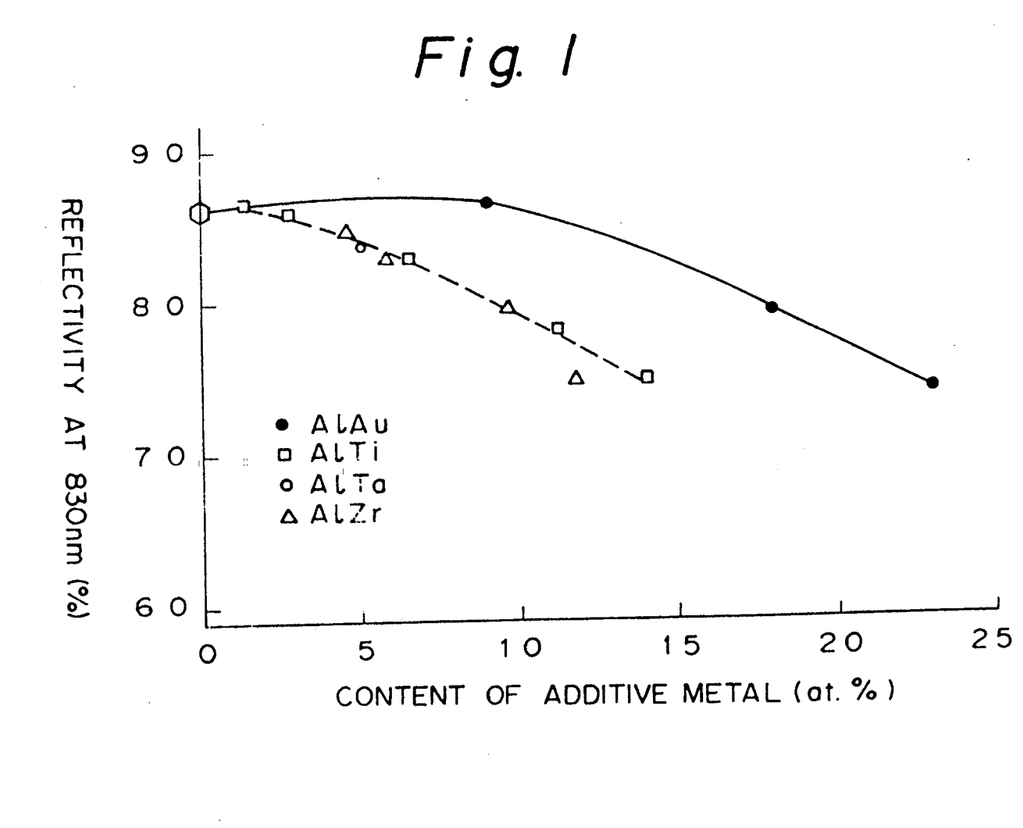
FIG. 1 shows the reflectivity of a metal reflecting layer of an Al alloy with an additive in relation to the content of the additive.

Surprisingly, it was found that the thermal conductivity of Al or Ag is lowered by alloying with Au having a high thermal conductivity (higher than that of Al), and that the reflectivity of the alloy remains high although the thermal conductivity thereof is lowered by the alloying. FIG. 1 shows the reflectivity at 830 nm of a metal reflecting layer of Al alloys of AlAu, AlTi, AlTa or AlZr in relation to the content of the additives. It is seen that the reflectivity of the Al layer is generally lowered by an addition of an additive such as Ti, Ta or Zr, and the degree of the lowering of the reflectivity is in proportion to the added amount of the additive. In contrast, although the thermal conductivity is lowered by alloying with Au, surprisingly, the reflectivity of the Al layer is increased by an addition with Au up to a certain content, and not lowered in proportion to the amount of the added additive of Au.

In the case of an Al-Au alloy, it is considered that the above phenomenon is due to the formation of an intermetallic compound of $Al_2Au$. For example, in an X-ray diffraction of a prior art Al alloy layer formed by sputtering an Al target with chips of Ta, Zr or Ti thereon, only diffraction peaks from the (1,1,1) plane of the face centered cubic (fcc) crystal lattice of Al were observed. In contrast, in an X-ray diffraction of an Al-Au alloy layer of the present invention, the diffraction peaks of the fcc crystal lattice of Al disappeared diffraction peaks of the (1,1,1) and (2,2,0) planes with interplanar spacings 0.349 nm and 0.214 nm of the intermetallic compound $Al_2Au$ were observed. Thus, a formation of the intermetallic compound $Al_2Au$ was confirmed and it is considered that this intermetallic compound $Al_2Au$ contributes to a lowering of the thermal conductivity.

The amount of Au to be added to Al or Ag is from 0.5 to 20 at %, preferably 0.5 to 15 at % for Al, and 0.5 to 30 at %, preferably 0.5 to 15 at % for Ag. If the amount of Au is less than 0.5 at %, little improvement of the recording sensitivity or lowering the thermal conductivity is obtained. If the amount of Au is higher than 20 at % in an Al-Au alloy or higher than 30 at % in an Ag-Au alloy, the effect of the improving the recording sensitivity is saturated and the C/N ratio is slightly lowered, probably due to a lowering of the reflectivity. The durability of a medium is also preferable in this range of the added amount. Note that the intermetallic compound $Al_2Au$ should be present in an adequate amount and dispersed in the Al-Au alloy layer, and should not cover the entire layer, to obtain the above preferable effects.

Further, it was also found that, by adding a certain element to an alloy of Al or Ag with Au, an improvement of the recording sensitivity or a lowering of the thermal conductivity, an increase of the C/N ratio, and an increase of the durability of an optical recording medium are obtained. The above certain element is at least one element selected from the group consisting of Ti, Ta, Zr and Y. By adding at least one of these elements, the effects of an addition of Au as mentioned before can be obtained by a lesser amount of Au and thus the cost can be reduced. Particularly, an Ag alloy with 0.5-15 at % Au and 0.3-12.0 at % at least one of the above elements is preferable due to its excellent recording sensitivity, durability under a high temperature and high humidity, C/N ratio, and cost, and such an Ag alloy having a total content of Au and said certain element of 1.0-15 at % is more preferable. Also, an Al alloy of 0.5-15 at % Au and 0.3-5.0 at % of at least one of the above elements is preferable, since if the content of said certain elements is more than 5.0 at %, the reflectivity of the layer is lowered and the formation of a uniform alloy target becomes difficult. When the content of said certain element is up to 5.0 at %, a lowering of the reflectivity of an Al-Au alloy layer is less than 2%, and the reflectivity of the Al-Au alloy layer is 86-82%. The total content of Au and the above elements is more preferably 1.0-15 at %.

Note, in an electron beam diffraction of an alloy layer of $Al_{89}Au_8Ti_3$ having a thickness of 100 nm, a diffraction ring of $Al_2Au$ in addition to that of Al was found. A transmission type electron microscopy of the above alloy layer revealed that the alloy layer is composed of a uniform assembly of very fine crystallites having a size of a few nm to 10 nm. Similar results were obtained in an Al-Au alloy layer. In contrast, when an Al layer and an $Al_{99}Ti_1$ alloy layer having a thickness of 100 nm were examined in the same way, crystallites having various sizes of 30 nm to 100 nm were observed. Thus, the high durability of an optical recording medium having a metal reflecting layer of an Al-Au alloy is considered to stem from not only an addition of the inert Au but also the dense structure of the alloy layer as shown above.

The thickness of the metal reflecting layer of the above alloy is preferably 10 to 200 nm, more preferably 30 to 80 nm. If the thickness of the layer is too thick, the recording sensitivity is lowered, and if the thickness of the layer is too thin, the reflectivity of the layer is lowered and the C/N ratio is reduced.

The metal reflecting layer may be formed by a conventional evaporation, sputtering, ion beam sputtering, chemical vapor deposition (CVD), etc., but sputtering is preferred because of an adhesive force thereof to the underlaying layer, a controllability of the composition, and a uniformity of the composition. The deposition rate and sputtering gas pressure, etc. may be appropriately selected in consideration of the productivity and the internal stress of the layer.

The optical recording medium is apparently not particularly limited as long as a reflecting layer is used, and may be a magneto-optical recording medium, a compact disc, a video disc, and the like. It is particularly applicable to a magneto-optical recording medium bearing a rare earth metal in the recording layer, in which the rare earth metal is sensitive to oxidation.

The magneto-optical recording medium may have any recording layer which utilizes the magneto-optical effect; typically, a magnetic layer having an easy magnetization axis perpendicular to the surface of the recording layer and thus a high magneto-optical effect, for example, of amorphous rare earth metal-transition metal alloys, such as TbFe, TbFeCo, TbGdFe, NdDyFeCo, etc. The thickness of the magneto-optical recording layer is 15 to 100 nm, preferably 20 to 50 nm.

The layer structure of the magneto-optical recording medium is not particularly limited except that a metal reflecting layer is placed on a side of a magneto-optical recording layer opposite to the light incident side. A structure having a transparent dielectric layer between the metal reflecting layer and the magneto-optical recording layer is preferable, since it improves the recording sensitivity, C/N ratio and durability. In this case, the thickness of the transparent dielectric layer should be thin, not more than 60 nm, to obtain the desired effects. A thin transparent dielectric layer does not allow to obtain a sufficient thermal insulating effect, and therefore, the metal layer of the present invention is still effective. Nevertheless, the content of Au or other additive element in the metal reflecting layer may be lowered along with an increase of the thickness of the transparent dielectric layer. A structure further having another transparent dielectric layer between the substrate and the magneto-optical recording layer is more preferably because it provides a further improvement of the C/N ratio and a prevention of humidity permeation. On the other hand, a structure having a metal reflecting layer in contact with the magneto-optical recording layer also allows practically efficient results if the metal reflecting layer is of an Al-Au or Ag-Au alloy. This structure allows an elimination of a transparent dielectric layer, and is preferable from the viewpoint of productivity and cost. These structures may be selected depending on the purpose of a medium.

The transparent dielectric layer between the magneto-optical recording layer and the substrate or the metal reflecting layer should have effects such as an enhancement of the Kerr effect, etc., and therefore, preferably has a relatively high refractive index. The transparent dielectric layer should be also transparent to a laser beam to be used. As such a transparent dielectric layer, oxides, nitrides, sulfides, carbides or fluorides of metals or composites thereof may be used. For example, silicon oxide, indium oxide, tantalum oxide, aluminum oxide, silicon nitride, aluminum nitride, titanium nitride, zinc sulfide, magnesium fluoride, aluminum fluoride, silicon carbide and composites thereof can be mentioned. These dielectrics may have a little light absorption at a level such that the C/N ratio is not remarkably reduced. The transparent dielectric layer may contain a metal element within such a tolerated amount. Further, an organic material such as poly-para-xylylene, polyimide, paraffin, etc. may be applied to the transparent dielectric layer. The transparent dielectric layer may be a composite layer or lamination of the above layers.

A transparent dielectric layer in contact with the magneto-optical recording layer, sensitive to oxidation, is preferably of a nitride or the like not containing oxygen, to prevent an oxidation or deterioration of the recording layer. Among others, silicon nitride, aluminum nitride and aluminum silicon nitride are preferable from the viewpoint of the layer quality and internal stress thereof.

The optimum thickness of the transparent dielectric layer is varied depending on the medium structure and the refractive indices of the layers. For example, in a structure having transparent dielectric layers on both sides of the magneto-optical recording layer, an optimum thickness of the transparent dielectric layer between the magneto-optical recording layer and the metal reflecting layer is varied by a thickness of the transparent dielectric layer between the magneto-optical recording layer and the substrate, and therefore, cannot be determined unconditionally. A transparent dielectric layer between the magneto-optical recording layer and the substrate having a thickness of 30–160 nm and a transparent dielectric layer between the magneto-optical recording layer and the metal reflecting layer having a thickness of 3–60 nm is preferably used, but the thicknesses of the transparent dielectric layers are not limited to the above ranges.

The above transparent dielectric layer may be formed by a conventional method. For example, an inorganic dielectric layer as mentioned above may be made by a known evaporation, sputtering, ion beam sputtering, CVD, etc.

The substrate is preferably made of glass, acrylic resin, polycarbonate resin, epoxy resin, 4-methylpentene resin, or modified chemicals thereof, with polycarbonate resin being most preferred from the viewpoints of mechanical strength, cost, weather resistance, heat resistance, and a low humidity permeation.

A protecting layer of an inorganic material may be formed on the metal reflecting layer, to further improve the durability under a high temperature and high humidity, and a durability against corrosive gases such as an acid gas. The inorganic protecting layer can be any layer having a permeation resistance and a gas barrier effect, but a layer having a low thermal conductivity and a high durability is preferred from the viewpoint of recording characteristics and a durability of the medium. As such an inorganic layer, a metal layer and a dielectric layer can be mentioned.

The above metal layer as the inorganic protecting layer should have a high durability per se and a low thermal conductivity to provide a good protection and ensure that the recording sensitivity is not lowered. A metal layer of any metal having such characteristics may be used, but a layer of Ti, Cr, Ni or an alloy thereof is particularly preferable. The thickness of the metal layer is preferably 1–30 nm, more preferably 3–25 nm, in view of the above-mentioned consideration.

A dielectric layer as the above inorganic protecting layer is superior because it has a low thermal conductivity such that a thick layer can be used without affecting the recording characteristics, and thus a good protection is obtained. Such a dielectric layer can be made of a dielectric material used for the before-mentioned transparent dielectric layer as an enhancement layer, but a layer of a nitride such as aluminum nitride, silicon nitride, aluminum silicon nitride, etc., or an oxide such as silicon oxide, titanium oxide, etc., is preferable because of its high humidity permeation resistance, and a nitride layer is more preferable because it does not involve oxygen. The thickness of the dielectric layer is determined in consideration of the thermal conductivity, productivity and improvement of the durability, and is varied, but preferably a thickness of 1–50 nm, more preferably 5–30 nm, is used.

The inorganic protecting layer preferably covers not only the top surface of the metal reflecting layer but also the sides of the metal reflecting layer and the optical recording layer, to provide a more complete protection.

The inorganic protecting layer may be formed by a conventional method such as evaporation, sputtering, ion beam sputtering, CVD, etc., but sputtering is preferable from the viewpoints of an adhesive force to the underlying layer, controllability of the alloy composition, and a uniformity of a composition. The deposition rate, gas pressure, etc. are appropriately determined in consideration of the productivity and internal stress of the layer.

Usually, an organic protecting layer of a photocurring or thermosetting resin or a thermoplastic resin is further applied on the inorganic protecting layer, to provide a mechanical protection and a further improvement of the durability. The thickness of this organic protecting layer is from a few microns to several tens of microns. Further, a hard organic layer having a thickness of from a few microns to several tens of microns may be applied to the substrate on the light incident side, to prevent damage by dust during a high speed rotation of the medium An optical recording medium having the structure described above is used, with a protecting plate or a protecting film if necessary, as a single sided recording medium, or two such optical recording media are bonded with the metal reflecting layer thereof facing with each other, and is used as a double sided recording medium.

The present invention is further described below by Examples of magneto-optical recording media comprising a metal reflecting layer of the present invention.

EXAMPLES

Examples 1-4 and Comparative example 1

Figure 2:
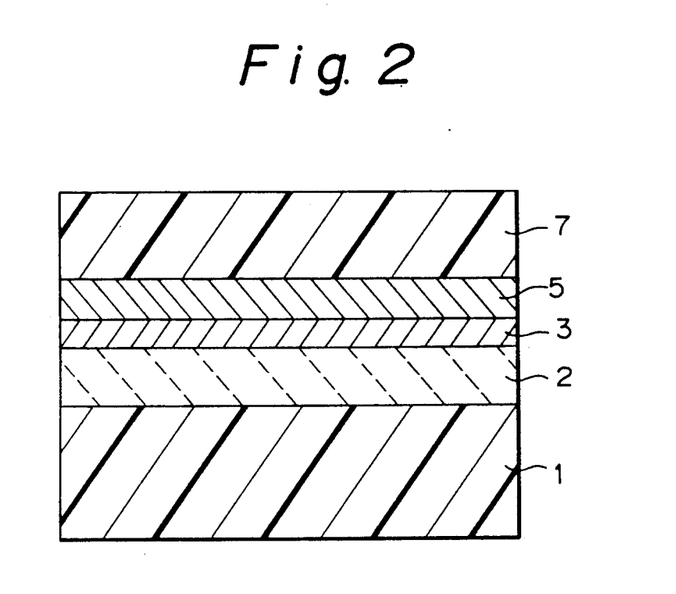
FIG. 2–6 schematically show sections of optical recording discs.

Magneto-optical recording media having a structure as shown in FIG. 2 were made. In FIG. 2, 1 denotes a transparent substrate, 2 a transparent dielectric layer, 3 a magneto-optical recording layer, and 5 a metal reflecting layer.

A disc-like substrate 1 of a polycarbonate (PC) resin having a diameter of 130 mm and a thickness of 1.2 mm, and having grooves at a pitch of 1.6 $\mu$m, was mounted in a vacuum chamber of an RF magnetron capable of mounting three targets, and the chamber was evacuated to less than $5.3 \times 10^{-5}$ Pa ($4 \times 10^{-7}$ Torr).

A mixed gas of Ar and $N_2$ (Ar:$N_2$=70:30) was introduced into the chamber and the flow rate of the gas mixture was regulated to a pressure of 1.3 Pa (10 mTorr). An AlSiN layer (80 nm thick) as the transparent dielectric layer 2 was deposited by RF sputtering, using a target of a sintered $Al_{50}Si_{50}$ (diameter 100 mm and thickness 5 mm) and an electrical discharge at a power of 500 Watts (W) and an RF of 13.56 MHz, while rotating the PC substrate.

Then a TbFeCo alloy layer (30 nm thick) as the magneto-optical recording layer 3 was deposited on the AlSiN layer by RF sputtering a target of a $Tb_{21}Fe_{71}Co_8$ alloy at an Ar gas pressure of 0.27 Pa (2 mTorr) and an electric discharge power of 150 W.

Then using targets of Al with a certain number of Au chips (3 mm square by 1 mm thick) placed on the target, metal reflecting layers (40 nm thick) 5 having compositions shown in Table 1 were deposited on the TbFeCo alloy layer 3 under conditions of an Ar gas pressure of 0.27 Pa (2 mTorr) and an electric discharge power of 100 W. The composition of the metal reflecting layer was controlled by varying the number of the Au chips on the Al target.

During the deposition of the above layers, the PC substrate was rotated at a speed of 20 rpm.

Thus, optical recording discs having a structure of PC substrate(1)/AlSiN(2)/TbFeCo(3)/metal(5) reflecting layer were obtained.

The C/N ratio and optimum recording laser power of the optical recording discs were evaluated by a magneto-optical recording and reproducing unit (Nakamichi, OMS-1000 type) under the following conditions. The optimum recording laser power was determined by varying the power of a laser diode for recording and selecting the power when the second harmonics of the reproducing signal are at a minimum.

Recording conditions:
  Disc rotation speed: 1800 rpm
  Position of recording on disc: 30 mm radius
  Recording frequency: 3.7 MHz
  Applied magnetic field during recording: 500 Oersteds
Reproducing conditions:
  Disc rotation speed: 1800 rpm
  Laser power for reproducing: 1.2 mW
The results are shown in Table 1.

Comparative example 1 was the same magneto-optical recording medium as Examples 1-4 except that the metal reflecting layer was an Al layer deposited using an Al target without the Au chips thereon in the same procedure as that of Examples 1-4. The optimum recording laser power of Comparative example 1 of more than 20 mW in Table 1 denotes that no reproducing signal was obtained by recording at the maximum power of the laser diode of 10 mW and a slight reproducing signal was obtained by recording at the maximum power of 10 mW and at a half speed of the above disc rotation speed.

TABLE 1

| Disc | Au content of metal reflecting layer (at %) | Optimum recording laser power (mw) | C/N ratio (dB) |
|---|---|---|---|
| Com. Ex. 1 | 0 | more than 20 | — |
| Ex. 1 | 3.0 | 7.5 | 46.5 |
| Ex. 2 | 5.0 | 7.0 | 46.6 |
| Ex. 3 | 15 | 6.5 | 46.6 |
| Ex. 4 | 20 | 5.5 | 45.9 |
| Com. Ex. 2 | 25 | 5.0 | 44.4 |

On the metal reflecting layer of the discs of Examples 1-4 and Comparative example 1, an ultra-violet ray curable phenol novolak epoxy acrylate resin was coated by a spin coater and was cured by irradiation of ultra-violet ray, to form an organic protecting layer 7 having a thickness of about 20 $\mu$m. These discs were subject to an accelerated aging test under a temperature of 80° C. and a relative humidity of 85% for hours and evaluated by the increased number of pin holes. The number of pin holes was not changed in Examples 3 and 4, was increased by 15 in Example 1 and by 10 in Example 2. In Comparative example 1, a large number of pin holes were found and the number thereof could not be counted. The optimum recording laser power and C/N ratio of the discs having the organic protecting layer were measured. In all Examples and Comparative example, the C/N ratios were not changed from those in Table 1 but the optimum recording laser powers were increased from those in Table 1 by about 0.8 mW. This suggests that the organic protecting layer 7 advantageously provides an improved durability but disadvantageously causes a lowering of the recording sensitivity.

Example 5

A magneto-optical recording disc was made and evaluated in the same manner as Examples 1-4. This magneto-optical recording disc was the same as Examples 1-4 except that the metal reflecting layer of $Al_{90.7}Au_{7.2}Ti_{2.1}$ was formed by an RF sputtering using an AlAuTi alloy target of a uniform composition having a diameter of 100 mm and a thickness of 5 mm in the manner as Examples 1-4.

The optimum recording laser power of the disc was 5.7 mW and the C/N ratio was 46.8 dB. It is clear from a comparison with Table 1 that the recording sensitivity of the medium of Example 5 (a reflecting layer of an Al alloy with 7.2% Au and 2.1% Ti) is as high as that of Example 3 (a reflecting layer of an Al alloy with as much as 15% Au) and the C/N ratio of Example 5 was good.

As seen from the above, by a metal reflecting layer of an Al alloy with Au and optionally Ti, a magneto-optical recording disc having a superior C/N ratio and recording sensitivity and a high durability were obtained. Particularly, when the content of Au or the total of Au and Ti is in a range of 3.0 at % or more, a lowering of the optimum recording laser power, i.e., the improvement of the recording sensitivity, is remarkable and the C/N ratio is high.

Examples 6-11 and Comparative examples 3-4

Figure 3:
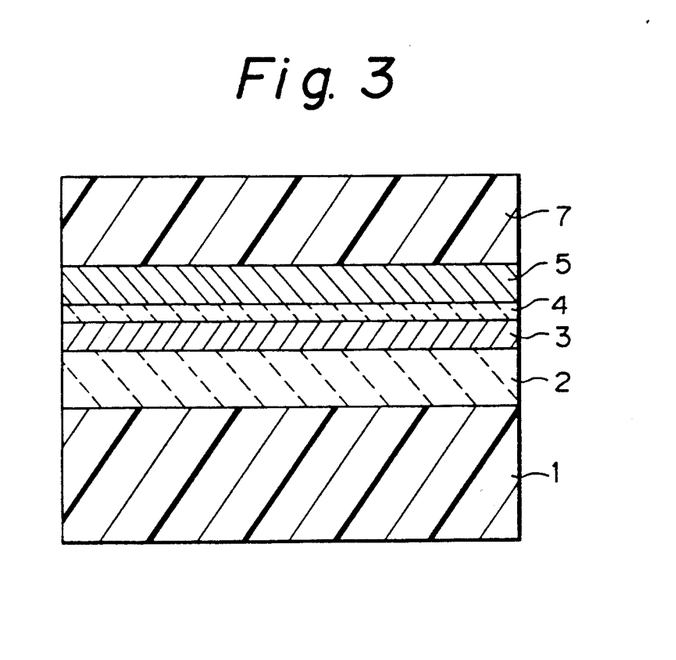

Magneto-optical recording discs having a structure of substrate(1)/first transparent dielectric layer(2)/magneto-optical recording layer(3)/second transparent dielectric layer(4)/metal reflecting layer(5)/organic protecting layer(7) were made and the composition of the metal reflecting layer thereof was varied (see FIG. 3). The media were evaluated in the same manner as in Examples 1-5.

A polycarbonate (PC) resin disc-like substrate 1 having a diameter of 130 mm and a thickness of 1.2 mm and having grooves at a pitch of 1.6 μm was mounted in a vacuum chamber of an RF magnetron sputtering unit (ANELVA Corporation SPF-430H) capable of mounting three targets, and the chamber was evacuated to less than $5.3 \times 10^{-5}$ Pa ($4 \times 10^{-7}$ Torr).

A mixture gas of Ar and $N_2$ (Ar $N_2$=70:30) was introduced into the chamber and the flow rate of the gas mixture was regulated to a pressure of 1.3 Pa (10 mTorr). An AlSiN layer (120 nm thick) as the first transparent dielectric layer 2 was deposited by RF sputtering, using a target of a sintered $Al_{30}Si_{70}$ (a diameter of 100 mm and a thickness of 5 mm) and an electrical discharge at a power of 500 W and an RF of 13.56 MHz, while rotating the PC substrate.

Then a TbFeCo alloy layer (22.5 nm thick) as the magneto-optical recording layer 3 was deposited on the AlSiN layer 2 by RF sputtering a target of a $Tb_{21}Fe_{71}Co_8$ alloy at an Ar gas pressure of 0.27 Pa (2 mTorr) and an electric discharge power of 150 W.

An AlSiN layer (40 nm thick) as the second transparent dielectric layer 4 was deposited on the TbFeCo layer 3 in the same manner as the first transparent dielectric layer 2.

Then using the AlAuTi alloy target of Example 5 [Example 11], or Al targets with a certain number of Au chips [Examples 6-10] or Ti chips [Comparative example 4] (3 mm square by 1 mm thick) placed on the target, metal reflecting layers (60 nm thick) 5 having compositions shown in Table 2 were deposited on the AlSiN layer 4 under conditions of an Ar gas pressure of 0.27 Pa (2 mTorr) and an electric discharge power of 100 W. The composition of the metal reflecting layer 5 was controlled by varying the number of the Au or Ti chips on the Al target.

During the deposition of the above layers, the PC substrate 1 was rotated at a speed of 20 rpm.

Comparative example 3 was a magneto-optical recording disc having the same structure as those of Examples 6-11 except that the metal reflecting layer was an Al layer deposited using an Al target without the Au chips thereon in the same procedure as Comparative example 1.

On the metal reflecting layer 5 of the obtained discs of Examples 6-11 and Comparative examples 3-4, an ultra-violet ray curable phenol novolak epoxy acrylate resin was coated by a spin coater and was cured by irradiation of ultra-violet ray, to form an organic protecting layer 7 having a thickness of about 20 μm.

The optimum recording laser power and C/N ratio of the discs were evaluated. The results are shown in Table 2.

Then the discs were subject to an accelerated aging test under a temperature of 80° C. and a relative humidity of 85% for 1000 hours and evaluated by counting the increased number of pin holes with the naked eye. The results are shown in Table 2.

TABLE 2

| Disc | Composition of metal reflecting layer (at %) | Optimum recording laser power (mW) | C/N ratio (dB) | Increased number of pin hole |
|---|---|---|---|---|
| Ex. 6 | $Al_{99.4}Au_{0.6}$ | 9.0 | 47.2 | 22 |
| Ex. 7 | $Al_{98.8}Au_{1.2}$ | 8.0 | 47.5 | 15 |
| Ex. 8 | $Al_{97}Au_3$ | 6.8 | 47.5 | 5 |
| Ex. 9 | $Al_{95}Au_5$ | 6.3 | 47.4 | 2 |
| Ex. 10 | $Al_{85}Au_{15}$ | 6.0 | 47.0 | 0 |
| Ex. 11 | $Al_{90.7}Au_{7.2}Ti_{2.1}$ | 5.5 | 47.5 | 0 |
| Com. Ex. 3 | Al | 9.5 | 46.7 | more than 100 |
| Com. Ex. 4 | $Al_{99.2}Ti_{0.8}$ | 8.5 | 47.3 | more than 100 |

From Table 2, it is seen that the magnet-optical recording disc of Comparative example 3 allowed a recording, different from Comparative example 1, but still has a large optimum recording laser power and a low C/N ratio and particularly, has a poor durability. The magneto-optical recording disc of Comparative example 4 has a good optimum recording laser power and C/N ratio, but a poor durability, as shown in Comparative example 3.

In contrast, in Examples 6-11, by containing 0.5 at % or more of Au in an AlAu alloy of the metal reflecting layer, the recording sensitivity (optimum recording laser power), C/N ratio and durability of the discs were improved and the discs have a high durability without problems. Particularly when the content of Au or the total content of Au and Ti is in a range of 1.0 at % or more, a remarkable improvement of the recording sensitivity is obtained and the C/N ratio and durability are good. From the viewpoints of these effects, the total content of Au and Ti is particularly preferably 1.0 to 15.0 at %.

From a comparison of Examples 6-11 with Examples 1-5, it is seen that a provision of a second transparent dielectric layer, although making the layer structure of the disc slightly complex, allows a lowering of the optimum recording laser power of more than 1 mW and an improvement of the C/N ratio of about 0.4-1.0 dB, as well as bringing a remarkable improvement of the durability.

Example 12

Figure 4:
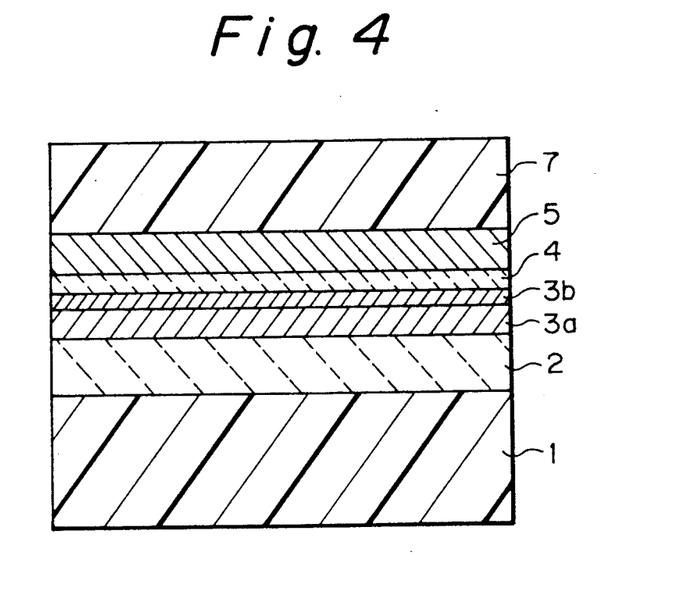

A magneto-optical recording disc having the same structure as that of Example 11 except that the magneto-optical recording layer was a bilayer comprised of GdFeCo and TbFeCo layers 3a and 3b was made. The bilayer of the magneto-optical recording layer was formed by RF sputtering an alloy target of $Gd_{21}Fe_{55}Co_{24}$ to deposit a GdFeCo layer (15 nm) 3a on the first transparent dielectric layer 2 and then an alloy target of $Tb_{21}Fe_{73}Co_6$ to deposit a TbFeCo layer (20 nm) 3b on the GdFeCo layer 3a (FIG. 4).

The disc was evaluated in the same manner as Example 11. The optimum recording laser power was 4.5 mW and the C/N ratio was 47.8 dB. The number of pin holes was not increased.

By using a bilayer magneto-optical recording layer, a magneto-optical recording disc having a remarkably improved recording sensitivity and a high C/N ratio and durability can be obtained.

Example 13

Figure 5:
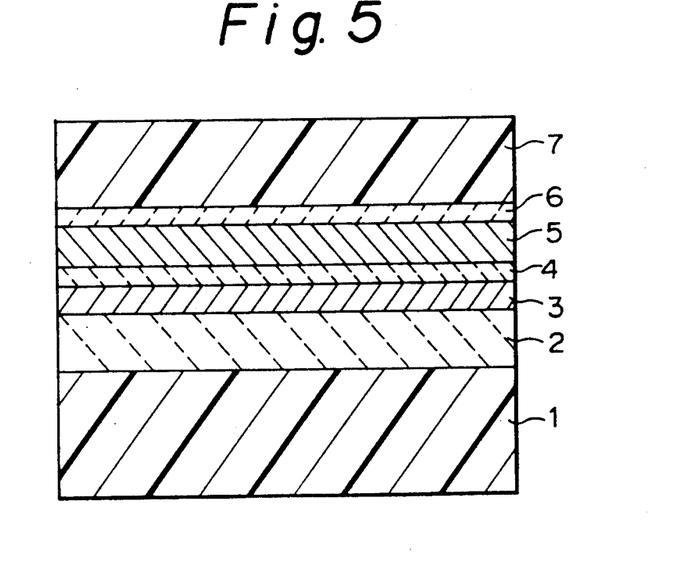

A magneto-optical recording disc having a structure of substrate(1)/first transparent dielectric layer(2)/magneto-optical recording layer(3)/second transparent dielectric layer(4)/metal reflecting layer(5)/inorganic protecting layer(6)/organic protecting layer(7) was made by forming layers from the first transparent dielectric layer 2 to the metal reflecting layer 5 on the substrate 1 in the same manner as Example 11, and forming an AlSiN layer as the inorganic protecting layer 6 on the metal reflecting layer 5 in the same manner as the first and second transparent dielectric layers 2 and 4 of Example 11, followed by forming an organic protecting layer (about 20 μm) 7 on the inorganic protecting layer 6 in the same manner as the organic protecting layer 7 of Example 11 (FIG. 5).

The disc was evaluated in the same manner as Examples 6-11. The optimum recording laser power was 5.5 mW and the C/N ratio was 47.6 dB, not different from those of Example 11.

The accelerated aging test was conducted for the disc of Example 13 together with the disc of Example 11 under the conditions of 80° C. and 85%RH for 3000 hours. As a result, in the disc of Example 11, a large number of pin holes were observed in a non-recording area around the center of the disc having a flat surface without grooves. In contrast, in the disc of Example 13 having an inorganic protecting layer, no pin holes were observed and a further improvement of the durability was obtained.

Example 14

Figure 6:
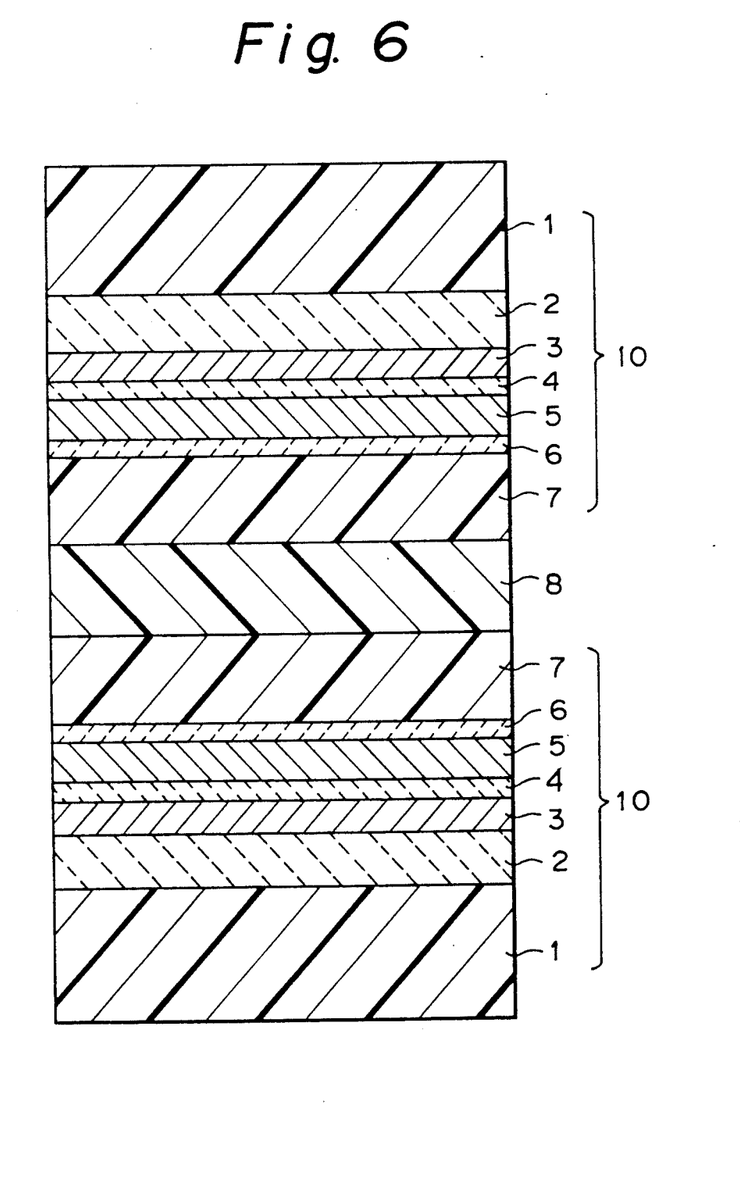

A double-sided recording disc was made by bonding two magneto-optical recording discs 10 of Example 13 on the protecting layer sides thereof with a hot melt adhesive 8 (FIG. 6).

The evaluation of the disc was conducted in the same manner as the other Examples. The recording sensitivity and C/N ratio were the same as those of Example 13, with differences within the measurement errors. No pin holes were observed after the same accelerated aging test (3000 hours) as that for Example 13.

The bit error rate of the overall recording surface of the disc was measured, using an error rate tester (manufactured by TASK Technology), before and after the above accelerated aging test and the change of the bit error rate was evaluated. The change was 1.5 times and 1.8 times for respective sides of the disc, both less than 2 times which is the limit for practical use.

Further, another durability test was conducted for the disc of Example 14 by a cycle test (ZAD test) in which the atmosphere starts from 60° C. and 95%RH and is varied between 60° C. and −25° C. in two days for one cycle, and 20 cycles were repeated. As a result, the bit error rates of the respective sides of the disc were not changed, $4 \times 10^{-6}$ and $2 \times 10^{-6}$, before and after the test. This shows that the disc has a very high durability.

Examples 15-18 and Comparative example 5

The procedures of Examples 1-4 and Comparative example 1 were repeated to make magneto-optical recording discs having the same structure as those of Examples 1-4 and Comparative example 1 except that the metal reflecting layer 5 was an AgAu alloy layer formed by RF sputtering using an Ag target with Au chips placed thereon and controlling the composition of the AgAu alloy layer by varying the number of the Au chips on the Ag target (see FIG. 1). The compositions of the discs of Examples 15-18 and Comparative example 5 are shown in Table 3.

The evaluation of the discs was conducted in the same manner as Examples 1-4 and Comparative example 1 except that the recording frequency was 2 MHz instead of 3.7 MHz for Examples 1-4.

The results are shown in Table 3.

TABLE 3

| Disc | Au content of metal reflecting layer (at %) | Optimum recording laser power (mw) | C/N ratio (dB) |
|---|---|---|---|
| Com. Ex. 5 | 0 | more than 20 | — |
| Ex. 15 | 2.0 | 8.5 | 55.2 |
| Ex. 16 | 5 | 7.0 | 55.4 |
| Ex. 17 | 15 | 6.0 | 55.3 |
| Ex. 18 | 30 | 5.5 | 53.1 |

On the metal reflecting layer 5 of the discs of Examples 15-18, a UV-curable phenol novolak epoxy acrylate resin was coated by a spin coater and cured by irradiating with UV rays, to form an organic protecting layer 7 having a thickness of about 20 μm. The discs were subject to an accelerated aging test under 70° C. and 85%RH for 1000 hours. The C/N ratio and the appearance of the discs of Examples 15-18 were not changed after the aging test, and thus the durability and protecting effect of the metal reflecting layers of Examples were confirmed.

Examples 19-23

Magneto-optical recording discs having the same structure as those of Examples 15-18, except that the metal reflecting layer of an AgAu alloy further contained Ti, Ta, Zr or Y, were made in the same manner as Examples 15-18. The metal reflecting layer of an AgAu alloy containing Ti, Ta, Zr or Y was formed by RF sputtering using an Ag target with Au chips and chips of Ti, Ta, Zr or Y placed on the target.

The evaluation of the discs was conducted in the same manner as Examples 15-18.

The results are shown in Table 4.

TABLE 4

| | Reflecting layer | | | Optimum | |
| | Au | Added element | | recording | C/N |
| Disc | content (at %) | Element | Content (at %) | laser power (mW) | ratio (dB) |
|---|---|---|---|---|---|
| Ex. 19 | 5 | Ti | 2 | 5.5 | 56.0 |
| Ex. 20 | 5 | Ti | 4 | 5.0 | 55.8 |
| Ex. 21 | 5 | Ta | 3 | 5.5 | 55.4 |
| Ex. 22 | 4 | Zr | 3 | 5.5 | 55.3 |
| Ex. 23 | 4.5 | Y | 2 | 5.5 | 55.8 |

The same organic protecting layer as that of Examples 15-18 was formed on the discs of Examples 19-23 and the accelerated aging test was conducted under the same conditions as Examples 15-18. The C/N ratio and the appearance of the discs were not changed after the aging test.

As seen in Examples 15-23, a metal reflecting layer of an AgAu alloy with an Au content of 0.5 at % or more allows to provide a magneto-optical recording disc having a high C/N ratio and recording sensitivity and an excellent durability and a metal reflecting layer of an AgAu alloy further containing Ti, Ta, Zr or Y allows a further improvement of the recording sensitivity.

Examples 24-26 and Comparative example 6

Magneto-optical recording media having the same structure as those of Examples 15-23 were made in the following manner and evaluation of the media was conducted under the conditions of a recording density and an accelerated aging test time which were about double those of Examples 15-23.

A disc-like substrate 1 of a polycarbonate (PC) resin having a diameter of 130 mm and a thickness of 1.2 mm and having grooves at a pitch of 1.6 μm was mounted in a vacuum chamber of an RF magnetron sputtering unit (ANELVA Corporation, type SPF-430H) capable of mounting three targets, and the chamber was evacuated to less than $5.3 \times 10^{-5}$ Pa ($4 \times 10^{-7}$ Torr).

A mixture gas of Ar and $N_2$ (Ar:$N_2$ = 70:30) was introduced into the chamber and the flow rate of the gas mixture was regulated to a pressure of 1.3 Pa (10 mTorr). An AlSiN layer (80 nm thick) as the transparent dielectric layer 2 was deposited by RF sputtering, using a target of a sintered $Al_{30}Si_{70}$ (a diameter of 100 mm and a thickness of 5 mm) and an electrical discharge at a power of 500 W and an RF of 13.56 MHz, while rotating the PC substrate.

Then a TbFeCo alloy layer (22.5 nm thick) as the magneto-optical recording layer 3 was deposited on the AlSiN layer 2 by RF sputtering a target of a $Tb_{21}Fe_{71}Co_8$ alloy at an Ar gas pressure of 0.27 Pa (2 mTorr) and an electric discharge power of 150 W.

Then using targets of Ag with a certain number of Au chips or Au and Ti or Ta chips (3 mm square by 1 mm thick) placed on the target, metal reflecting layers (40 nm thick) 5 having compositions shown in Table 5 were deposited on the TbFeCo alloy layer 3 under conditions of an Ar gas pressure of 0.27 Pa (2 mTorr) and an electric discharge power of 100 W. The composition of the metal reflecting layer 5 was controlled by varying the number of the Au, Ti and Ta chips on the Ag target.

During the deposition of the above layers, the PC substrate 1 was rotated at a speed of 20 rpm.

Thus, optical recording discs having a structure of PC substrate(1)/AlSiN(2)/TbFeCo(3)/metal reflecting layer (5) were obtained (see FIG. 2).

Further on the metal reflecting layer 5, a UV-curable phenol novolak epoxy acrylate resin was coated and cured by irradiating with UV-rays, to form an organic protecting layer 7 having a thickness of about 20 μm (FIG. 2).

The original characteristics of the obtained optical recording discs were evaluated, and a durability test of the discs under 80° C. and 85%RH was conducted for 2000 hours, double that of Examples 15-23, and the C/N ratio and the increase in the number of pin holes were then determined. The original characteristics of the discs were evaluated by using a magneto-optical recording and reproducing unit (Nakamichi OMS-1000 type) under the following conditions and by varying the power of a laser diode for recording and selecting the power at which the second harmonics of the reproducing signal are at a minimum as the optimum recording laser power. Then the recording frequency was 3.7 MHz, about double that of Examples 15-23.

Recording conditions:
 Disc rotation speed: 1800 rpm
 Position of recording on disc: 30 mm radius
 Recording frequency: 3.7 MHz
 Applied magnetic field during recording: 500 Oersteds
 Duty: 50%

Reproducing conditions:
 Disc rotation speed: 1800 rpm
 Laser power for reproducing: 1.2 mW The results are shown in Table 5.

Comparative example 6 was a magneto-optical recording disc having the same structure as those of Examples 24-26 except that the metal reflecting layer was an Ag layer deposited using an Ag target without Au or Ti, Ta chips thereon in the same procedure as Examples 24-26. The optimum recording laser power of Comparative example 6 of more than 10 mW in Table 5 denotes that no reproducing signal was obtained by recording at the maximum power of the laser diode of 10 mW.

In Examples 24-26, the number of increased pin holes is slightly large, but even after the accelerated aging test for 2000 hours, the C/N ratio was not changed, and the C/N ratio and the recording recording sensitivity were high enough to be practically used.

TABLE 5

| Disc | Composition of metal reflecting layer (at %) | Optimum recording laser power (mW) | C/N ratio (dB) | Increased number of pin hole |
|---|---|---|---|---|
| Ex. 24 | $Ag_{95}Au_5$ | 8.0 | 48.4 | 14 |
| Ex. 25 | $Ag_{95}Au_4Ti_1$ | 7.0 | 48.5 | 9 |
| Ex. 26 | $Ag_{92}Au_5Ta_3$ | 6.5 | 48.2 | 12 |
| Com. Ex. 6 | Ag | more than 10 mW | — | more than 100 |

Examples 27-35 and Comparative examples 7-8

Magneto-optical recording discs having a structure similar to those of Examples 15-26 but including another transparent dielectric layer 4 between the magneto-optical recording layer 3 and the metal reflecting layer 5 were made and evaluated (see FIG. 3).

The transparent dielectric layer (12 nm thick) between the magneto-optical recording layer 3 and the metal reflecting layer 5 was formed in the same manner as the transparent dielectric layer 2 between the substrate 1 and the magneto-optical recording layer 3 of Examples 24-26. The metal reflecting layer 5 had an AgAu alloy composition shown in Table 6.

The evaluation of the discs was conducted in the same manner as Examples 24-26.

TABLE 6

| Disc | Composition of metal reflecting layer (at %) | Optimum recording laser power (mW) | C/N ratio (dB) | Increase in number of pine holes |
|---|---|---|---|---|
| Ex. 27 | $Ag_{98}Au_2$ | 8.0 | 48.4 | 10 |
| Ex. 28 | $Ag_{95}Au_5$ | 7.5 | 48.5 | 7 |
| Ex. 29 | $Ag_{85}Au_{15}$ | 7.0 | 48.2 | 5 |
| Ex. 30 | $Ag_{70}Au_{30}$ | 6.5 | 47.6 | 5 |
| Ex. 31 | $Ag_{95}Au_4Ti_1$ | 6.5 | 48.6 | 2 |
| Ex. 32 | $Ag_{86}Au_4Ti_{10}$ | 6.0 | 47.6 | 2 |
| Ex. 33 | $Ag_{93}Au_4Ta_3$ | 6.5 | 48.2 | 3 |
| Ex. 34 | $Ag_{93}Au_4Zr_3$ | 6.5 | 48.2 | 3 |
| Ex. 35 | $Ag_{94}Au_4Y_2$ | 6.5 | 48.6 | 2 |
| Com. Ex. 7 | Ag | more than 10 | — | 48 |
| Com. Ex. 8 | $Al_{98}Ti_2$ | 7.5 | 47.5 | more than 100 |

The disc of Comparative example 7 had the same structure as that of Examples 27-35 but the metal reflecting layer 5 was an Ag layer formed by sputtering an Ag target without Au chips or the like. The disc of Comparative example 8 had the same structure as that of Examples 27-35 but the metal reflecting layer 5 was an AlTi (Ti: 2 at %) layer (60 nm thick) formed by sputtering an Al target with Ti chips.

In Comparative example 7 using a metal reflecting layer 5 of Ag, the recording power was so high that it could not be determined by the unit for measurement (maximum power 10 mW), and the number of the pin holes was greatly increased after the accelerated aging test. In Comparative example 8, using a metal reflecting layer of AlTi, the C/N ratio was low and the number of pin holes was remarkably increased. In contrast, in Examples 27-35, it was confirmed that the recording sensitivity and C/N ratio were high, and the durability was good since the C/N ratio was not changed and only a slight increase in the number of pin holes was found after the accelerated aging test for 2000 hours.

It was confirmed from a comparison with Examples 24-26 that a provision of a transparent dielectric layer 4 between the magneto-optical recording layer 3 and the metal reflecting layer 5, although making the construction of the disc slightly complex, remarkably improves the durability of the disc under a high temperature and high humidity and improves recording and reproducing characteristics such as the C/N ratio and recording sensitivity.

Examples 36-41

Magneto-optical recording discs having the structure similar to that of Examples 27-35 but further including an inorganic protecting layer 6 between the metal reflecting layer 5 and the organic protecting layer 7 were made (see FIG. 5) and evaluated in the same manner as Examples 27-35. More specifically, Examples 36-41 was the same as a thickness shown in Table 7 was formed in the same manner as Examples 27-35 or a Ti layer 6 having a thickness shown in Table 7 was formed by RF sputtering a Ti target under the same conditions as those for the magneto-optical recording layer of Examples 27-35. The results of evaluation of the discs are shown in Table 7.

TABLE 7

| Disc | Composition of metal reflecting layer (at %) | Inorganic protecting layer Material | Inorganic protecting layer Thickness (nm) | Optimum recording laser power (nW) | C/N ratio (dB) | Increase in number of pin holes |
| --- | --- | --- | --- | --- | --- | --- |
| Ex. 36 | $Ag_{95}Au_5$ | Ti | 15 | 8.0 | 48.5 | 0 |
| Ex. 37 | $Ag_{95}Au_5$ | AlSiN | 20 | 7.5 | 48.6 | 0 |
| Ex. 38 | $Ag_{95}Au_4Ti_1$ | Ti | 10 | 6.5 | 48.6 | 1 |
| Ex. 39 | $Ag_{95}Au_4Ti_1$ | Ti | 20 | 7.0 | 48.7 | 0 |
| Ex. 40 | $Ag_{95}Au_4Ti_1$ | AlSiN | 10 | 6.5 | 48.7 | 1 |
| Ex. 41 | $Ag_{95}Au_4Ti_1$ | AlSiN | 20 | 6.5 | 48.8 | 0 |

By providing an inorganic protecting layer 6, a magneto-optical recording disc can have a high recording sensitivity and C/N ratio as well as a further improved durability. Particularly, a magneto-optical recording disc having an AlSiN layer as an inorganic protecting layer 6 can have an improved durability without any lowering of a recording sensitivity and C/N ratio.

Examples 42-43

The same magneto-optical recording discs as Example 41, except that the thickness of the transparent dielectric layer 2 and 4 were varied, were made and evaluated (FIG. 5).

The results are shown in Table 8.

TABLE 8

| Disc | Thickness of inorganic protecting layer 2 (nm) | Thickness of Inorganic protecting layer 4 (nm) | Optimum recording laser power (mW) | C/N ratio (dB) | Increase in number of pine hole |
| --- | --- | --- | --- | --- | --- |
| Ex. 42 | 120 | 30 | 6.5 | 48.8 | 0 |
| Ex. 43 | 120 | 35 | 6.5 | 48.7 | 0 |

The same magneto-optical recording disc as Example 41, except that the magneto-optical recording layer was a bilayer comprised of GdFeCo and TbFeCo layers, was made. The bilayer of the magneto-optical recording layer was formed by RF sputtering an alloy target of $Gd_{21}Fe_{55}Co_{24}$ to deposit a GdFeCo layer (15 nm) 3a on the first transparent dielectric layer 2 and then an alloy target of $Tb_{21}Fe_{73}Co_6$ to deposit a TbFeCo layer (20 nm) 3b on the GdFeCo layer 3a (see FIG. 4).

The disc was evaluated in the same manner as Example 41. The optimum recording laser power was 5.0 mW and the C/N ratio was 49.0 dB. The number of pin holes was not increased.

By using a bilayer magneto-optical recording layer, a magneto-optical recording disc having a remarkably improved recording sensitivity and a high C/N ratio and durability is obtainable.

We claim:

1. An optical recording medium comprising:
    a transparent substrate;
    an optical recording layer deposited over the substrate; and
    a metal reflecting layer deposited over the optical recording layer;
    wherein the metal reflecting layer consists essentially of an alloy of aluminum with 0.5 to 20 at % gold.

2. A medium according to claim 1 wherein the content of the gold is 0.5 to 15 at %.

3. A medium according to claim 1, wherein the metal reflecting layer further contains 0.3 to 5.0 at % of at least one element selected from the group consisting of titanium, tantalum, zirconium and yittrium.

4. A medium according to claim 3, wherein the total content of the gold and at least one element selected from the group consisting of titanium, tantalum, zirconium and yittrium is 1.0 to 15.0 at %.

5. A medium according to claim 1, wherein the metal reflecting layer is in contact with the optical recording layer.

6. A medium according to claim 1, further comprising a transparent dielectric layer deposited between the optical recording layer and the transparent substrate.

7. A medium according to claim 1, further comprising a transparent dielectric layer deposited between the metal reflecting layer and the optical recording layer.

8. A medium according to claim 1, further comprising an inorganic protecting layer deposited over the metal reflecting layer.

9. A medium according to claim 1, wherein the optical recording layer is a magneto-optical recording layer.

10. A medium according to claim 3, wherein the metal reflecting layer is an alloy of aluminum with gold and titanium.

11. A medium according to claim 9, comprising:
    a transparent substrate;

a first transparent dielectric layer of a nitride on the transparent substrate;

a magneto-optical recording layer on the first transparent dielectric layer;

a second transparent dielectric layer of a nitride on the magneto-optical recording layer;

a metal reflecting layer on the second transparent recording layer, the metal reflecting layer consisting essentially of an alloy of aluminum with 0.5 to 20 at % gold; and an inorganic protecting layer on the metal reflecting layer.

12. An optical recording medium comprising:
a transparent substrate;
an optical recording layer deposited over the substrate; and
a metal reflecting layer deposited over the optical recording layer;
wherein the metal reflecting layer consists essentially of an alloy of silver with 0.5 to 30 at % gold.

13. A medium according to claim 12, wherein the content of the gold is 0.5 to 15 at %.

14. A medium according to claim 12, wherein the metal reflecting layer further contains 0.3 to 12.0 at % of at least one element selected from the group consisting of titanium, tantalum, zirconium and yittrium.

15. A medium according to claim 14, wherein the total content of the gold and at least one element selected from the group consisting of titanium, tantalum, zirconium and yittrium is 1.0 to 15.0 at %.

16. A medium according to claim 12, wherein the metal reflecting layer is in contact with the recording layer.

17. A medium according to claim 12, further comprising a transparent dielectric layer deposited between the optical recording layer and the transparent substrate.

18. A medium according to claim 12, further comprising a transparent dielectric layer deposited between the metal reflecting layer and the optical recording layer.

19. A medium according to claim 12, further comprising an inorganic protecting layer deposited over the metal reflecting layer.

20. A medium according to claim 12, wherein the optical recording layer is a magneto-optical recording layer.

21. A medium according to claim 14 wherein the metal reflecting layer is an alloy of silver with gold and titanium.

22. A medium according to claim 20, comprising:
a transparent substrate;
a first transparent dielectric layer of a nitride on the transparent substrate;
a magneto-optical recording layer on the first transparent dielectric layer;
a second transparent dielectric layer of a nitride on the magneto-optical recording layer;
a metal reflecting layer on the second transparent recording layer, the metal reflecting layer consisting essentially of an alloy of silver with 0.5 to 30 at % gold; and
an inorganic protecting layer on the metal reflecting layer.

* * * * *